L. TEESE & SON.
Sluice Fork.
No. 12,453.
Patented Feb. 27, 1855.
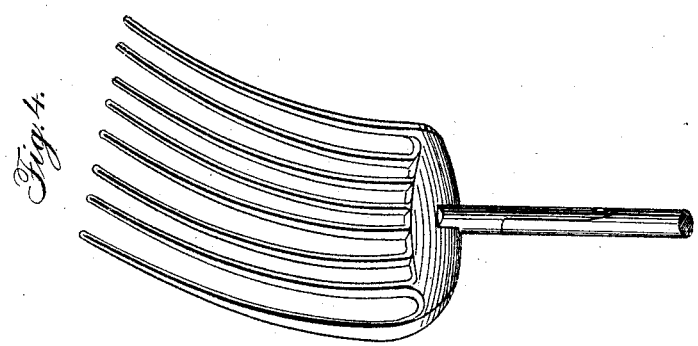
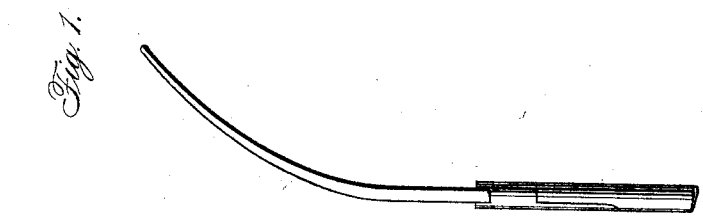
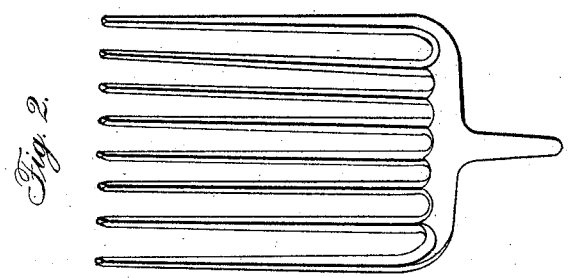
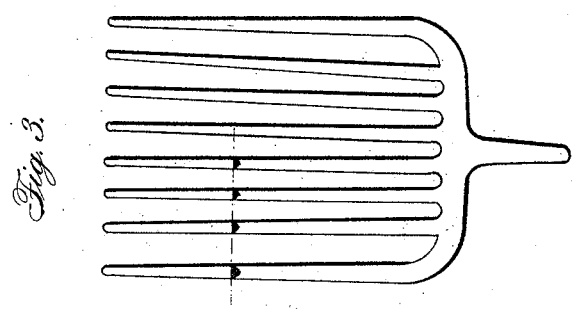
Witnesses:
Sampson Wallis
M. Magee
Inventor:
Lewis Teese & Son

UNITED STATES PATENT OFFICE.

LEWIS TEESE & SON, OF SAN FRANCISCO, CALIFORNIA.

IMPROVEMENT IN FORKS FOR GOLD-DIGGERS.

Specification forming part of Letters Patent No. 12,453, dated February 27, 1855; antedated November 27, 1854.

*To all whom it may concern:*

Be it known that we, LEWIS TEESE & SON, of the city of San Francisco, in the county of San Francisco and State of California, have invented a new and useful Improvement on the Machines called "Sluice-Forks," used for the purpose of removing stones from sluices and sluice-boxes in gold-washing, of which the following is a full and exact description of our fork.

It has eight tines or prongs thirteen inches long from heel to point. The tops of the tines or prongs are triangular shape, so that the smallest particle of gold cannot lodge on them. The bottom of the tines or prongs is a flat even surface, so that the fork will slide easily and not wear out the sluice-boxes. The curves in the tines or prongs are two inches; the fork, from outside to outside, nine inches, the same breadth heel and point. The tines taper very little from heel to point, and the points blunt the weight of fork, with handle about five pounds, made of cast-steel.

Drawing No. 1 refers to the curve of the tines or prongs. Drawing No. 2 refers to the face or front of the tines or prongs. Drawing No. 3 refers to the back or bottom of the tines or prongs; drawing No. 4, perspective view of the fork.

What we claim, and desire to secure by Letters Patent of the United States, is—

Making the fork-tines triangular, with one side of the triangle forming the back of the tines, for the purposes and in the manner set forth in our specification, whether applied to more or less number of tines or length or breadth of fork.

In witness whereof we have hereunto subscribed our names the 1st day of August, 1854.

LEWIS TEESE & SON. [L. S.]

In presence of—
    J. W. BROOKS,
    J. ROOT.